United States Patent [19]
Klimek

[11] 3,809,441
[45] May 7, 1974

[54] MODULATING APPLICATION VALVE
[75] Inventor: Boleslaw Klimek, Des Plaines, Ill.
[73] Assignee: Berg Mfg. & Sales Co., Des Plaines, Ill.
[22] Filed: Oct. 12, 1971
[21] Appl. No.: 188,479

Related U.S. Application Data
[63] Continuation of Ser. No. 4,550, Jan. 21, 1970, abandoned.

[52] U.S. Cl............... 303/52, 251/77, 137/505.12, 137/505.48, 137/627.5
[51] Int. Cl............................................. B60t 15/06
[58] Field of Search ............... 303/54, 53, 52, 40; 137/505.12, 505.18, 505.42, 510, 468, 627.5; 251/77

[56] References Cited
UNITED STATES PATENTS
3,355,223  11/1967  Klimek.................... 303/52
2,599,577  6/1952  Norgren................. 137/505.18
2,478,040  8/1949  Campbell et al......... 137/505.42
3,450,154  6/1969  Bueler........................ 303/52
3,390,920  7/1968  Dobrikin..................... 303/52
3,515,441  6/1970  Stein........................... 303/54
3,576,193  4/1971  Rothfuss et al......... 137/505.12
3,532,395  11/1970  Julow..................... 137/627.5
3,366,136  1/1968  Burton....................... 137/468
2,704,548  3/1955  Ralston...................... 137/510

Primary Examiner—George E. A. Halvosa
Assistant Examiner—Edward Kazenske
Attorney, Agent, or Firm—Kinzer, Plyer, Dorn & McEachran

[57] ABSTRACT

A vehicle brake application valve, wherein a valve opening piston is moved through the mediacy of a first spring at a first force transmitting ratio and thereafter through the mediacy of a second spring at a second force transmitting ratio.

3 Claims, 1 Drawing Figure

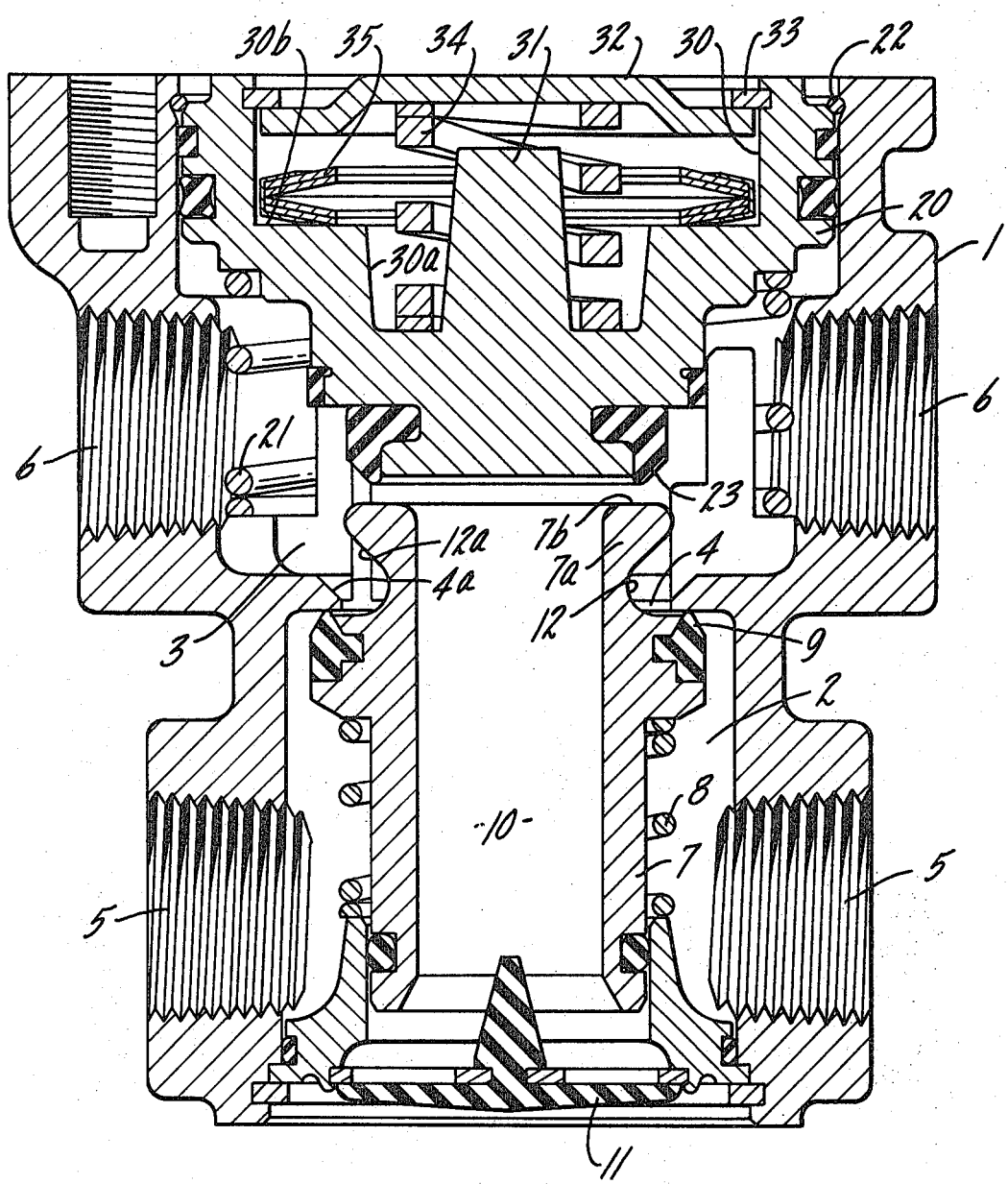

MODULATING APPLICATION VALVE

This is a continuation, of application Ser. No. 4,550, filed Jan. 21, 1970, now abandoned.

SUMMARY OF THE INVENTION

This invention relates to vehicle air brake systems and has particular relation to a brake application valve therefor.

One purpose of the invention is to provide an application valve effective to modulate the pressures supplied therethrough in response to varying extent of operation thereof.

Another purpose is to provide a brake application valve having motion-transmitting springs of varying characteristics.

Another purpose is to provide a brake application valve having force-transmitting springs of varying characteristics and effective at predetermined points in the excursion of said valve.

Another purpose is to provide a modulating application valve substantially unaffected by temperature changes.

Another purpose is to provide an application valve having maximum air-transmitting configurations.

Other purposes will appear from time to time during the course of the specification and claims.

BRIEF DESCRIPTION OF THE DISCLOSURE

The invention is illustrated more or less diagrammatically in the accompanying drawing wherein:

The FIGURE is a side elevation in cross section.

Like parts are indicated by like numerals throughout the specification and drawing.

DESCRIPTION OF THE PREFERRED EMBODIMENT

The application valve of the invention includes a housing 1. Defined within housing 1 are chambers 2 and 3, the chambers 2,3 communicating through a passage 4. Inlets 5 communicate with chamber 2 and outlets 6 communicate with chamber 3.

A shuttle valve member 7 is reciprocal within chamber 2 and is yieldingly urged, as by spring 8, to seat its valve face 9 against a seat formed in the housing 1 and surrounding the passage 4 within chamber 2. The shuttle 7 is of hollow tubular configuration providing an axial exhaust passage 10 open at its lower end, as the parts are shown, for exhaust through a flapper valve 11 to atmosphere. The opposite open end of passage 10 is positioned within chamber 3. The extension 7a of shuttle 7, which extends beyond the valve face 9 and through passage 4 into chamber 2 has a reduced curved external configuration 12 in alignment with passage 4 and rising well into chamber 2 therefrom, the minimum diameter of the configuration 12 being in alignment with passage 4 when the shuttle member is in the position shown in the drawing.

Within chamber 3 a valve-operating piston 20 is reciprocal, a spring 21 yieldingly urging the piston 20 upwardly as the parts are shown, against a retainer ring 22. Piston 20 carries a valve face 23 for engagement with the end face 7b of shuttle 7 within housing 2.

The opposite face of piston 20 from that which carries the valve element 23 is hollowed to form a piston chamber 30. The chamber 30 has a reduced, inwardly extending portion 30a forming the annular shelf 30b between the chambers 30,30a. An axial postlike portion 31 extends upwardly, as the parts are shown, through chamber portion 30a and into chamber 30.

An actuating plate 12 closes the open upper end, as the parts are shown, of chamber 30 and is yieldingly urged against a retainer ring 33 by a spring 34 which surrounds post 31 and has its opposite end in engagement with the base of chamber portion 30a.

A bellville or washer spring member 35 rests on shelf 30b and has its upper surface spaced from plate 32 when the parts are at their rest position as shown in the drawing.

The use and operation of the invention are as follows:

It will be understood that a suitable actuating element such as a foot pedal (not shown) is normally supplied for actuation of the plate 32 in response to normally downward motion of such foot pedal. Downward motion of plate 32 initially tends to compress spring 34 and to transmit the force thereof to piston 20 to move it downwardly. At a predetermined point in the downward excursion, as the parts are shown, of plate 32, contact thereof is made with bellville spring member 35. Thereafter the motion and force of plate 32 is transmitted through member 35 to piston 20.

Post 31 provides an abutment for plate 32 limiting the extent of force transmission through springs 34,35 and thereafter insuring direct operation of piston 20 by the foot pedal operating member.

At a predetermined point in the downward movement of piston 20, against the action of spring 21, valve face 23 is brought into contact with end surface 7b of shuttle 7, closing the exhaust passage 10. Continued downward movement of piston 20 produces a like downward movement of shuttle 7 against the action of spring 8 to unseat valve face 9 and to open passage 4 for communication of inlets 5 with outlets 6. With valve face 9 unseated, the reduced segment 12 of shuttle 7 provides for maximum air passage between inlets 5 and outlets 6, the chamfered or upwardly, outwardly flared surface 4a of passage 4 and the paralleling flared surface 12a of shuttle 7 providing for smooth and uninterrupted delivery of fluid pressure from chamber 2 to chamber 3.

Thus the operator, when applying relatively limited amounts of brake operation, is provided with a proper sensitivity or "feel" thereof through the mediacy of spring 34. The rate or force characteristics of spring 34 being predetermined, the amount of fluid pressure supplied to the vehicle brakes as a result of a movement of the brake pedal under such circumstances can be charted and is seen to disclose a relatively straight or continuous curve. When, however, the operator desires a greater amount of braking action in relation to foot pedal movement, while not yet desiring a full or "crash" brake application, washer spring member 35 is effective between plate 32 and piston 20 to produce a greater amount of vehicle braking action in response to predetermined foot movement, the relationship when charted reflecting a rapidly rising curve. Abutment 31 provides for maximum brake application in emergency-type situation.

The spring 34, providing for "soft" brake application, i.e., a small force-transmission in relation to relatively large deflections of the foot pedal and plate 32, and the washer spring member 35, providing for a "harder" brake application, i.e., a relatively large force-transmission in response to smaller deflections of the foot pedal and plate 32, are both substantially immune to termperature changes and will maintain their relationship through wide temperature ranges.

The smoothly curved recess 12 and the paralleling conical surfaces 4a, 12a provide for a smooth conical flow of air from chamber 2 to chamber 3 and reduce the number of sharp turns required in such air flow, resulting in a more rapid transmission of volume fluid pressure through the valve of the invention.

The embodiments of the invention in which an exclusive property or privilege is claimed are defined as follows:

1. A modulating brake application valve assembly for fluid pressure vehicle brake systems, said assembly including a housing, an inlet chamber and an outlet chamber in said housing, a passage between said chambers, a valve member yieldingly urged into a position closing said passage, a piston reciprocal in said outlet chamber, said piston being normally spaced from and out of contact with said valve member and positioned for movement into contact with said valve member to open said valve member, an actuating plate mounted for repeated reciprocation in one end of said piston, a first yielding means having a first predetermined force transmission ratio and being positioned between and contacting said actuating plate and said piston to urge said plate and piston in opposite directions, an abutment fixed on said piston and rising axially from said piston to be contacted by said actuating plate at a predetermined point in the movement of said plate, said first yielding means being centered about said abutment and seated on said piston, a second yielding means having a second predetermined force transmission ratio and being positioned between said actuating plate and said piston, a supporting surface on said piston intermediate said plate and said piston support for said first yielding means, said second yielding means being seated on said piston support surface and being normally spaced from said plate, whereby initial valve opening movement of said actuating plate is transmitted to said piston at a first ratio through said first yielding means and continuing movement of said actuating plate is transmitted to said piston at a second ratio through said second yielding means, said valve being operable solely in response to movement of said plate and piston and unaffected by fluid pressures within said housing.

2. The structure of claim 1 wherein said first yielding means comprises a coiled spring member and said second yielding means comprises a washer spring member.

3. The structure of claim 1 wherein said first yielding means provides for relatively small movement of said piston in response to relatively large valve-opening movement of said actuating plate and said second yielding means provides for relatively larger valve-opening movement of said piston in response to relatively smaller valve-opening movement of said actuating plate.

* * * * *